United States Patent

Beren et al.

[11] Patent Number: 6,143,825
[45] Date of Patent: Nov. 7, 2000

[54] ADHESIVE PROPYLENE POLYMER COMPOSITIONS SUITABLE FOR COATING SUBSTRATES

[75] Inventors: James R. Beren, West Chester, Pa.; Edward M. Phillips, Elkton, Md.

[73] Assignee: Montell Technology Company BV, Netherlands

[21] Appl. No.: 09/312,265

[22] Filed: May 14, 1999

[51] Int. Cl.[7] .............................. C08L 51/00; C08L 51/06
[52] U.S. Cl. .................................. 525/70; 525/74; 525/78
[58] Field of Search .................................. 525/70, 74, 78

[56] References Cited

U.S. PATENT DOCUMENTS

| | | | |
|---|---|---|---|
| 4,824,736 | 4/1989 | Ehrig et al. | 428/623 |
| 5,047,485 | 9/1991 | DeNicola, Jr. | 525/387 |
| 5,218,029 | 6/1993 | Brook | 524/365 |
| 5,286,564 | 2/1994 | Cecchin et al. | 428/402 |
| 5,302,454 | 4/1994 | Cecchin et al. | 428/402 |
| 5,326,639 | 7/1994 | Leonard et al. | 428/402 |
| 5,441,999 | 8/1995 | Jarvis et al. | 524/271 |
| 5,500,284 | 3/1996 | Burgin et al. | 428/349 |
| 5,541,260 | 7/1996 | Pelliconi | 525/240 |
| 5,554,668 | 9/1996 | Scheve et al. | 522/157 |
| 5,591,785 | 1/1997 | Scheve et al. | 522/157 |
| 5,605,936 | 2/1997 | DeNicola, Jr. | 521/50.5 |
| 5,677,378 | 10/1997 | Hasegawa | 525/74 |
| 5,731,362 | 3/1998 | Scheve et al. | 521/142 |
| 5,744,086 | 4/1998 | Hallam | 264/296 |

FOREIGN PATENT DOCUMENTS 873862  10/1998  European Pat. Off. .

Primary Examiner—Jeffrey C. Mullis

[57] ABSTRACT

An adhesive composition suitable for coating onto a substrate, containing a blend of the following components:
(a) a propylene polymer;
(b) a high melt strength propylene polymer having a branching index of less than 0.9 or a melt tension of 3 to 28 cN; and
(c) a modified propylene polymer grafted with an unsaturated compound having a polar group. Also disclosed is a coated article including (a) a primer-coated substrate, and (b) a layer of the composition applied to the primer surface of the primer-coated substrate.

12 Claims, No Drawings

ADHESIVE PROPYLENE POLYMER COMPOSITIONS SUITABLE FOR COATING SUBSTRATES

BACKGROUND OF THE INVENTION

Commercially available propylene polymers such as propylene homopolymers, propylene copolymers containing 1 to 10 weight percent ethylene, 1–20 weight percent $C_4$–$C_{10}$ α-olefin, and heterophasic propylene polymers or mixtures thereof, have relatively low melt strength. Thus, when molten, propylene polymers exhibit little or no strain hardening (an increase in resistance to stretching during elongation of the molten material). Low melt strength can lead to a variety of melt processing problems, including sheet sag and local thinning in melt thermoforming processes, and flow instabilities in the coextrusion of laminate structures.

High melt strength propylene polymers can be prepared from normally linear propylene polymers. U.S. Pat. No. 5,554,668 discloses the formation of free-end long branches by irradiating linear propylene polymer material in a substantially oxygen-free environment (less than about 5% by volume) with high energy radiation at a dose and for a time effective to produce a substantial amount of molecular chain scission but insufficient time to cause gelation of the propylene polymer material, maintaining the irradiated propylene polymer in the substantially oxygen-free environment for a time sufficient for a significant amount of chain branches to form, and then deactivating substantially all the free radicals present in the irradiated propylene polymer material. The resulting branched propylene polymer material has high melt strength.

Various proposals have been made to increase the adhesion of propylene polymer layers to substrates such as metal. Known surface treatments include corona discharge and chemical modification such as exposure to a concentrated solution of sulfuric acid and chromic acid. U.S. Pat. No. 4,824,736 discusses the addition of maleic anhydride-modified polypropylene exhibits good adhesion to metal. See also U.S. Pat. No. 5,441,999, which discloses a hot melt adhesive comprising a blend of a low molecular weight polyolefin, olefin-maleic anhydride grafted copolymer, a propylene-ethylene copolymer and a tackifing resin.

Commercially available propylene polymer materials, high melt strength propylene polymers and blends thereof do not significantly adhere to metal substrates, such as aluminum, even if subjected to post heating treatment, or to typical primer-coated polymeric substrates without post heating treatment. Thus, it is typically necessary to coat the metal substrates with a primer coating prior to applying the propylene polymer in order to ensure adequate adhesion and to post heat treat typical primer-coated polymeric substrates to achieve acceptable adhesion. Obviously, this type of surface pretreatment and/or post treatment introduces added complexity and cost to the manufacture of propylene polymer-coated substrates.

An object of the present invention is to provide a propylene polymer composition having high melt strength which has improved adhesion to metal without the need for a primer coating or to polymeric substrates, including lightly metallized polymeric substrates, with a primer coating without the need for post heating.

Another object of the present invention is to provide a substrate which has a layer of highly adherent propylene polymer on at least one surface.

A feature of this invention is the addition of modified propylene polymer grafted with an unsaturated compound having a polar group to a high melt strength propylene polymer composition to improve its adhesion to metal and plastic substrates.

An advantage of this invention is the elimination of a intermediate adhesive coating between the metallic substrate and the high melt strength propylene polymer composition.

SUMMARY OF THE INVENTION

In one aspect, the present invention relates to a highly adhesive composition suitable for high speed coating onto a substrate, comprising a blend of the following components:
(a) a propylene polymer;
(b) a high melt strength propylene polymer having a branching index of less than 0.9 or a melt tension of 3 to 28 cN; and
(c) a modified propylene polymer grafted with an unsaturated compound having a polar group.

In another aspect, the present invention relates to a coated article comprising
(a) a primer-coated substrate, and
(b) a layer applied to the primer surface of the primer-coated substrate comprising a blend of the following components:
(1) a propylene polymer;
(2) a high melt strength propylene polymer having a branching index of less than 0.9 or a melt tension of 3 to 28 cN; and
(3) a modified propylene polymer grafted with an unsaturated compound having a polar group.

DETAILED DESCRIPTION OF THE INVENTION

The first component of the composition of the present invention is a propylene polymer which may be a homopolymer of propylene, a copolymer of propylene with ethylene or a $C_{4-10}$ α-olefin, heterophasic propylene polymers or mixtures thereof. Propylene polymers are commercially available, and can be in any physical form, for example, spherical, granules, pellets, film, sheet, and the like. However, the propylene polymer is preferably in a finely divided condition with satisfactory results being obtained at an average spherical or pellet particle size of about 0.5 to 7 mm.

The amount of propylene polymer present in the composition ranges from 50 to 80 percent, preferably 60 to 72 percent, by weight, based on the total weight of the composition.

The melt flow rate of the propylene polymer preferably ranges from 15 to 60, most preferably 20 to 40 grams/10 minutes.

When a propylene copolymer is used it typically contains 0.5 to 10 weight percent ethylene when ethylene is the comonomer, 0.5 to 20 weight percent when a $C_{4-10}$ α-olefin is the comonomer or when it is used together with ethylene as a comonomer.

Suitable heterophasics include propylene polymer compositions consisting essentially of:
(1) (a) greater than 60 to about 85 parts of a crystalline polymer fraction selected from the group consisting of (i) a copolymer of propylene and at least one alpha-olefin having the formula $H_2C=CHR$, where R is H or a $C_{2-6}$ straight or branched chain alkyl, containing over 85% by weight propylene and having an isotacticity index of greater than 75, (ii) a polybutene-1 having an isotacticity index of greater than 75, (iii) an ethylene homopolymer having a density of 0.95 g/cm³ or greater, or a copolymer of ethylene with a $C_{3-8}$ alpha-olefin having a density of 0.94 g/cm³ or greater, or (iv) mixtures thereof,
  (b) from about 1 up to less than 15 parts of a semi-crystalline, low density, essentially linear copolymer fraction having a crystallinity of 20 to 60% by differential scanning calorimetry and consisting of propylene and over 90 wt. % of units of the alpha-olefin ethylene or of units consisting substantially of the alpha-olefin ethylene and a different alpha-olefin having the formula set forth above in (a), which copolymer is insoluble in xylene at room temperature, and
  (c) from about 10 to less than 39 parts of an amorphous copolymer fraction of the alpha-olefin ethylene and propylene containing from about 30 to about 80 weight % ethylene, with or without (i) 1 to 10% of a diene or (ii) about 3 to about 10% of a different alpha-olefin termonomer having the formula set forth above in (a), which amorphous copolymer fraction is soluble in xylene at room temperature, provided that the alpha-olefin(s) used to produce (b) and (c) are the same,
said thermoplastic olefin polymer having a flexural modulus lower than 1000 MPa to 150 MPa;
  (2) (a) 10–60 parts by weight of homopolymer polypropylene with isotactic index greater than 90, or of crystalline propylene copolymer with ethylene, with a $CH_2=CHR$ olefin where R is a 2–6 carbon alkyl radical, or combinations thereof, containing over 85% by weight of propylene and having an isotactic index greater than 85,
  (b) 10–40 parts by weight of a crystalline polymer fraction containing ethylene and propylene having an ethylene content of from about 52% to about 75% and insoluble in xylene at room temperature, and
  (c) 30–60 parts by weight of an amorphous ethylene-propylene copolymer fraction containing optionally small proportions of a diene, soluble in xylene at room temperature and containing 40 to 70% by weight ethylene,
the composition having a flex modulus smaller than 700 MPa;
  (3) (a) 10–50 parts by weight of a homopolymer of propylene with isotactic index greater than 80, or a copolymer of propylene with ethylene, a $CH_2=CHR$ α-olefin where R is a 2–8 carbon alkyl radical or combination thereof, which copolymer contains over 85% by weight of propylene and having an isotactic index greater than 80,
  (b) 5–20 parts by weight of a copolymer fraction of ethylene and propylene or another $CH_2=CHR$ α-olefin where R is a 2–8 carbon alkyl radical, or combination thereof, containing greater than about 51% by weight ethylene, insoluble in xylene at ambient temperature, and
  (c) 40–80 parts by weight of a copolymer fraction of ethylene and propylene or another $CH_2=CHR$ α-olefin, where R is a 2–8 carbon alkyl radical, or combinations thereof, and optionally, minor portions of a diene, said fraction containing from 20 to less than 40% by weight of ethylene, being soluble in xylene at ambient temperature, and having an intrinsic viscosity from 1.5 to 4 dl/g;
    wherein the percent by weight of the sum of the (b) and (c) fractions with respect to the total polyolefin composition being from 50% to 90% and the (b)/(c) weight ratio being lower than 0.4, and said composition having a flexural modulus of less than 150 MPa; and
  (4) (a) a homopolymer of propylene or a random copolymer of propylene and an olefin selected from the group consisting of ethylene and $C_{4-10}$ alpha-olefins, provided that, when said olefin is ethylene, the maximum polymerized ethylene content is up to 10%, and when said olefin is a $C_{4-10}$ alpha-olefin, the maximum polymerized alpha-olefin content is up to 20%, and
    (b) from 5 to 60% of an ethylene-propylene copolymer rubber having an ethylene content of from 20 to 70%, or an ethylene-propylene non-conjugated diene monomer rubber having a diene content of from 2 to 8% and an ethylene content of from 20 to 70%.

The composition (1) can be prepared by the polymerization process described in U.S. Pat. No. 5,326,639 the disclosure of which is incorporated herein by reference.

Compositions (2) and (3) can be prepared by the polymerization processes described in U.S. Pat. Nos. 5,302,454 and 5,286,564, respectively, the disclosures of which are incorporated herein by reference.

Composition (4) can be prepared by well-known polymerization methods such as slurry, liquid, gas, or liquid-gas processes. They can also be prepared by mechanically mixing the two preformed polymers in a suitable industrial mixer, such as a Haske or Banbury mixer.

The second component of the composition of the present invention is a high melt strength propylene polymer having a branching index of less than 0.9 or a melt tension of 3 to 28 cN. The high melt strength propylene polymer can be prepared from a propylene polymer discussed above using the irradiation process disclosed in U.S. Pat. No. 5,554,668, the disclosure of which is incorporated herein by reference.

The second component can also be prepared by the process disclosed in U.S. Pat. No. 5,047,485, the disclosure of which is incorporated by reference.

The branching index quantifies the degree of long chain branching present in the high melt strength propylene homopolymer. It is defined by the equation:

$$g'=[IV]_{Br}/[IV]_{Lin}$$

in which g' is the branching index, $[IV]_{Br}$ is the intrinsic viscosity of the branched propylene polymer and $[IV]_{Lin}$ is the intrinsic viscosity of the corresponding, linear propylene polymer of substantially the same molecular weight average molecular weight.

The melt tension of the second component is preferably 8 to 26 cN, more preferably 12 to 24 cN. Melt tension provides an indication of the melt strength of the material, and may be determined with a Gottfert Rheotens melt tension apparatus from Gottfert Inc. by measuring the tension of a strand of molten polymer in centi-Newtons as follows: the polymer to be examined is extruded at 180□ C. through a capillary 20 mm long and 2 mm in diameter; the strand is then subjected to stretching using a drawing system with a constant acceleration of 0.3 cm/sec². The tension resulting from the above drawing is measured (in centi-Newtons). The higher the melt tension means the greater the melt strength values which, in turn, are indicative of the particular material's strain hardening ability.

The high melt strength propylene polymer is present in an amount which ranges from 10 to 30, preferably 15 to 25, percent by weight, based on the total weight of the composition.

The third component of the composition is a modified propylene polymer grafted with an unsaturated compound having a polar group, hereinafter referred to as "modified propylene polymer." The unsaturated compound having a polar group can be an α, β-unsaturated carboxylic acid or alicyclic carboxylic acid and derivatives thereof, such as acrylic acid, methacrylic acid, maleic acid, fumaric acid, itaconic acid, endo-cyclo(2,2,1)-5-heptene-2,3-carboxylic acid, and cis4-cyclohexane-1,2-carboxylic acid and anhydrides, esters, amides and imides thereof Maleic anhydride-modified propylene polymer is preferred, and may be prepared by treating a propylene polymer with maleic anhydride in the presence of a peroxide. More particularly, maleic anhydride may be mixed with finely divided propylene polymer and a peroxide at a temperature below the activation temperature of the peroxide employed to form a blend which is then extruded into a strand and pelletized using conventional apparatus and the methods disclosed in U.S. Pat. No. 4,824,736, the disclosure of which is incorporated by reference herein. Maleic anhydride-modified polypropylenes are commercially available.

The modified propylene polymer preferably has from 0.5 to 5 weight percent of unsaturated compound having a polar group, preferably 1.0 to 4.0 weight percent and most preferably from 1.0 to 3.5 weight percent unsaturated compound.

The amount of modified propylene polymer present in the composition ranges from 3 to 30 percent, preferably 8 to 20 percent, most preferably from 8 to 12 percent, based on the total weight of the composition. While in the broadest ambit of the invention the amount of unsaturated compound is from 0.015 to 1.5 weight % of the composition, typically, the total amount of unsaturated compound having a polar group in the composition should be at least 0.07 weight percent, preferably 0.08 to 1.2 weight percent, most preferably 0.08 to 0.2 weight percent (based on the modified propylene polymer), for adhesion to metallic substrates and from 0.03 to 0.07 weight percent, preferably 0.03 to 0.15 weight percent, most preferably 0.05 to 0.08 weight percent for adhesion to polymeric substrates.

The amount of adhesion needed varies depending on the use of application. Thus, compositions containing overall lower levels of the unsaturated compound with a polar group have sufficient bonding for use in certain flexible packaging applications and as small snack bags, for example, small potato chip bags. Whereas, for the can industry, at least 8 weight percent of the unsaturated compound with a polar group is needed for a suitable bond.

The highly adhesive composition of the present invention may be prepared by mixing its three components to form a blend, extruding the blend to form a strand, and pelletizing the extruded strand using well-known conventional techniques and apparatus.

The adhesive composition of the present invention has particular utility as a coating for substrates, such as steel and aluminum, and primer-coated polymeric substrates, such as polyesters, polyamides, polyethylenes, polypropylenes and polyvinylidene chlorides. Metal substrates suitable for use as containers for foodstuffs and beverages are particularly preferred.

The composition may be coated upon such substrates using conventional apparatus and techniques well known to those of ordinary skill in the art. The coating thickness of the extruded composition preferably ranges from 0.25 to 1.0 mil.

The composition of the present invention is highly adhesive and thus an adhesive primer coating is not required for metal substrates and a post heat treatment is not required for primer-coated polymeric substrates. Suitable extrusion coating primers for polymeric substrates include polyethylene imine and chromium complex modified acrylic polymer.

Unless otherwise stated, all amounts in this specification are by weight.

EXAMPLES

Examples 1–2 and Comparative Example 1

These examples illustrate the adhesion of the composition of the invention to metal substrates when coated thereon and followed by post heating.

The compositions were formulated by mixing commercially available starting materials together to form a blend, extruding the blend using a 2.5 inch diameter, single screw Killion extruder, and pelletizing the extruded strand.

The pelletized compositions were then extrusion coated onto aluminum sheet at speeds in excess of 1000 feet per minute. Neck-in of approximately 2 inches on each side of the sheet was observed. "Neck-in" is the difference between the die width and the final coat width of the substrate. The coating thickness of the extruded compositions ranged from 0.25 to 0.8 mils.

The coating line employed in this example did not have an in-line, post-coating heating apparatus. Instead, the coated aluminum sheets were subjected to a thermal crosslinking step by placing them in an oven for 50 seconds at 170° C. Measurement of the coatings' adhesion to the aluminum sheet substrate is somewhat subjective because the desired adhesion is stronger than the tensile strength of the coating, which makes a T-peel Instron test or its equivalent impractical. Instead, adhesion was evaluated by determining whether the coating adhered sufficiently strongly that it was possible to remove it only in small chips or not at all. Thus, a coating that was removed in relatively large sections of approximately ½ inch diameter would be considered to have inadequate adhesion under this test.

The compositions and results are set forth in Table I.

TABLE I

| Examples | PP Homopolymer[1] | HMS Propylene Polymer[2] | Maleic Anhydride Modified PP[3] | Neck-in at 1000 fpm | Adhesion to Substrate |
|---|---|---|---|---|---|
| 1 | 60% | 20% | 20% | 3 inch | Essentially inseparable |
| 2 | 50% | 20% | 30% | 3 inch | Essentially inseparable |
| Comparative Example 1 | 80% | 20% | — | 3 inch | Essentially None (<10 g/inch) |

[1]PH6201 propylene homopolymers having a MFR of 20 g/10 minutes, measured according to ASTM-D 1238, Condition L.
[2]PF633 polymer having a melt tension of 19 cN.
[3]HERCOPRIME G-211 maleic anhydride-modified propylene polymer having a maleic anhydride content of about 3.5 weight percent.

Examples 3–5 and Comparative Examples 2–4

These examples illustrate the adhesion of the composition of the invention to metal substrates when coated thereon and followed by post heating.

Various compositions were formulated by mixing commercially available starting materials together to form a blend, extruding the blend using a Werner & Pfleiderer ZSK-40 twin screw extruder, and pelletizing the extruded strand. The pelletized compositions were then extrusion coated onto aluminum sheet at speeds in excess of 1000 feet per minute, and a coating thickness of from 0.25 to 0.8 mils thick.

The coating line employed in this example did not have an in-line, post-coating heating apparatus. Instead, the coated aluminum sheets were subjected to a thermal crosslinking step by placing them in an oven for 50 seconds at 170° C.

The compositions and results are set forth in Table II.

TABLE II

| Example | PP Homopolymer[4] | HMS Propylene Polymer | Maleic Anhydride Modified Polypropylene | Neck-In at 1000 fpm | Adhesion to Substrate |
| --- | --- | --- | --- | --- | --- |
| Comparative Example 2 | 76% | 20% | 4%[5] | 3 inch | Failed - Separation possible |
| Example 3 | 72% | 20% | 8%[5] | 3 inch | Inseparable |
| Example 4 | 68% | 20% | 12%[5] | 3 inch | Inseparable |
| Comparative Example 3 | 70% | 20% | 10%[6] | 3 inch | Failed - Separation possible |
| Example 5 | 60% | 20% | 20%[5] | 3 inch | Inseparable |
| Comparative Example 4 | 80% | 20% | — | 3 inch | Essentially None |

[4]Blend of PH-821S propylene homopolymer having a melt flow rate of 37 g/10 minutes and PH-6301 propylene homopolymer having a melt flow rate of 12 g/10 minutes.
[5]Polybond 3000 maleic anhydride/polypropylene graft copolymer containing ≈1 weight percent maleic anhydride.
[6]Fusabond 109 maleic anhydride/polypropylene graft copolymer containing 0.55 weight percent maleic anhydride.

The level of adhesion performance varied with the overall anhydride level in the amount of modified propylene polymer used in the composition.

Example 6

The composition was formulated by mixing commercially available starting materials together to form a blend, extruding the blend using a Werner & Pfleiderer ZSK-40 twin screw extruder, and pelletizing the extruded strand.

The pelletized composition was then extrusion coated onto aluminum sheet at a melt temperature of 564° C. and a coating thickness of 0.3 to 0.45 mil. The coating line was equipped with a transverse flux induction heating coil which allowed in-line heating of the extruded coating at the desired 450° C. temperature at line speeds of up to 700 feet per minute.

The composition and results are set forth in Table III.

Examples 7–9 and Comparative Example 5

These examples illustrate adhesion of the inventive composition to primer-coated surfaces without post heat treatment wherein the primers are those to which commercially available propylene polymers, high melt strength propylene polymers or blends thereof do not adhere.

Two types of primer coatings currently in common use as extrusion coating primers were applied to aluminum substrate using a #3 Meyer rod, and dried using a heat gun. A polypropylene composition having the following composition was then extruded onto the primer coated surface of a primed aluminum substrate by hand-feeding the sheets through an extrusion coating apparatus at 300 feet per minute:

| | |
| --- | --- |
| 37% | by weight linear propylene homopolymer having a melt flow rate of 12 g/10 minutes. |
| 35% | by weight linear propylene homopolymer having a melt flow rate of 37 g/10 minutes. |
| 20% | by weight of PF633 high melt strength propylene homopolymer. |
| 8% | by weight of Polybond 3000 maleic anhydride/polypropylene graft copolymer containing approximately 1 percent maleic anhydride. |

The inventive composition was coated at a melt temperature of 590° C., a coating thickness of 0.8 mil, a coating weight of 11 lb/R, a chill roll temperature of 65° F. (18.3° C.). Test data is set forth in Table IV below:

TABLE III

| Example | PP Homopolymer[7] | HMS Propylene Polymer | Maleic Anhydride Modified Polypropylene | Neck-In at 700 fpm | Adhesion to Substrate |
| --- | --- | --- | --- | --- | --- |
| 6 | 72% | 20% | 8%[8] | 2 inch | Inseparable |

[7]Blend of PH-821S homopolymer having a melt flow rate of 37 g/10 minutes, and PH-6301 propylene homopolymer having a melt flow rate of 12 g/10 minutes.
[8]Polybond 3000 maleic anhydride/polypropylene graft copolymer containing ≈1 weight percent maleic anhydride.

TABLE IV

| Examples | Primer Coating | Adhesion (grams/inch) |
| --- | --- | --- |
| Comparative 5 | — | <10 |
| Example 7 | Mica A-131-x[9] | 293 |
| Example 8 | Mica A-291-C[10] | Adhesion good. Prior to delamination the coating stretched. |
| Example 9 | Mica A-291-C (aluminum substrate backed with tape) | 431 |

[9]Mica A-131-x contains an aqueous dispersion of polyethylene imine.
[10]Mica A-291-C contains an aqueous dispersion of chromium complex modified acrylic polymer.

Examples 10 to 13 and Comparative Examples 6–9

These examples illustrate the improved adhesion provided by the inventive composition to primer-coated substrates wherein the primers are those to which commercially available propylene polymers, high melt strength propylene polymers and blends thereof do adhere.

Two types of primer coatings were applied to the polyvinylidene chloride surface of a polyvinylidene chloride coated, biaxially oriented polypropylene substrate using a #3 Meyer rod, and dried using a heat gun. The coated sheets were then overcoated with the same polypropylene composition employed in Example 7 by hand-feeding the sheets through an extrusion coating apparatus at 300 feet per minute. The inventive composition was coated at a melt temperature of 590° C., a coating thickness of 0.8 mil, a coating weight of 11 lb/R, a chill roll temperature of 65° F. (18.3° C.). Test data is set forth in Table V below:

[9] Mica A-131-x contains an aqueous dispersion of polyethylene imine.

[10] Mica A-291-C contains an aqueous dispersion of chromium complex modified acrylic polymer.

TABLE V

| Example | Primer Coating | Adhesion (grams/inch) |
| --- | --- | --- |
| Example 10 | A7734A[11] | □350 |
| Comparative 6 | A7734A | 297 |
| Example 11 | A4693 | 304 |
| Comparative 7 | A4693[12] | 207 |
| Example 12 | S-119841[13] | 223 |
| Comparative 8 | S-119841 | 91 |
| Example 13 | S119822[14] | 145 |
| Comparative 9 | S119822 | 90 |

[11]Latiseal A7734A is an aqueous copolymer dispersion and is commercially available from Pierce & Stevens.
[12]A4693 is styrene-butadiene polymer, polyterpene and dipentene polymer in a cyclohexane/acetone solvent system commercially available from 3M.
[13]S-119841 is a solvent-based adhesive commercially available from Bostik Incorporated.
[14]S-119822 is a polyester solvent-based adhesive commercially available from Bostik Incorporated.

Example 14

This example illustrates the use of a heterophasic propylene polymer as component (a).

The composition was formulated and pelletized according to the procedures of Example 1 except that a single screw Werner & Pfleiderer extruder was used. The commercially available starting materials used in the composition were (1) 70% of a heterophasic propylene polymer material containing 88% homopolymer of propylene and 12% of an ethylene-propylene copolymer rubber, which material had an ethylene content of 7.8%, based on the material, and a MFR of 70 g/10 minutes, (2) 17.2% HMS propylene polymer material having a melt tension of 16 cN, and (3) 12.2% maleic

[11] Latiseal A7734A is an aqueous copolymer dispersion and is commercially available from Pierce & Stevens.

[12] A4693 is styrene-butadiene polymer, polyterpene and dipentene polymer in a cyclohexane/acetone solvent system commercially available from 3M.

[13] S-119841 is a solvent-based adhesive commercially available from Bostik Incorporated.

[14] S-119822 is a polyester solvent-based adhesive commercially a vailable from Bostik Incorporated.

anhydride modified propylene polymer having a maleic anhydride content of 3.2–3.5 weight percent.

The pelletized compositions were extrusion coated onto an aluminum sheet at speeds of 150–200 ft/min. to produce a coating thickness of from 0.5 to 1 mil. No appreciable neck-in was observed. The coated sheet was then heated in a hot air oven at 350° F. for 2 minutes.

The initial adhesion was good and the final adhesion to the aluminum was essentially inseparable.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A composition suitable for coating metallic or primer-coated polymeric substrates, comprising a blend of the following components, by weight:

(a) 50 to 80% of a propylene polymer;
   (b) 10 to 30% of a high melt strength propylene polymer having a branching index of less than 0.9 or a melt tension of 3 to 28 cN; and
   (c) 3 to 30% of a modified propylene polymer grafted with an unsaturated compound having a polar group,
   wherein the total of (a), (b) and (c) equals 100%.

2. The composition of claim 1, wherein the amount of propylene polymer present in the composition ranges from 60 to 72 percent by weight, based on the total weight of the composition.

3. The composition of claim 1, wherein the amount of said high melt strength propylene polymer is from 15 to 25 percent by weight, based on the total weight of the composition.

4. The composition of claim 1, wherein the amount of said modified propylene polymer is from 8 to 20 percent by weight, based on the total weight of the composition.

5. The composition of claim 4, wherein the amount of said modified propylene polymer is from 8 to 12 percent by weight, based on the total weight of the composition.

6. The composition of claim 1, wherein the modified propylene polymer has an unsaturated compound having a polar group content from 0.5 to 5 weight percent, based on the weight of the modified propylene polymer.

7. The composition of claim 6, wherein said modified propylene polymer has an unsaturated compound having a polar group content of 1.0 to 4.0 weight percent.

8. The composition of claim 1, wherein an amount of unsaturated compound having a polar group is at least 0.015 percent by weight based on the total weight of the composition.

9. The composition of claim 8, wherein said amount of unsaturated compound having a polar group is 0.08 to 0.7 weight percent, based on the total weight of the composition.

10. The composition of claim 1, wherein an amount of unsaturated compound having a polar group is from 0.03 to 0.15 weight percent based on the total weight of the composition.

11. A coated article comprising:
(a) a primer-coated substrate, and
(b) a layer applied to the primer surface of the primer-coated substrate comprising the composition of claim 1.

12. The coated article of claim 11, wherein said substrate is selected from the group consisting of metal and polymeric substrates.

* * * * *